No. 868,333. PATENTED OCT. 15, 1907.
E. R. DRAVER.
MEANS FOR IMPARTING GYRATORY MOTION TO SIEVE BOXES AND OTHER BODIES.
APPLICATION FILED JUNE 9, 1906.

2 SHEETS—SHEET 1.

Witnesses.
N. D. Kilgore.
E. W. Jippunn

Inventor.
Emil R. Draver.
By his Attorneys.

No. 868,333. PATENTED OCT. 15, 1907.
E. R. DRAVER.
MEANS FOR IMPARTING GYRATORY MOTION TO SIEVE BOXES AND OTHER BODIES.
APPLICATION FILED JUNE 9, 1906.
2 SHEETS—SHEET 2.
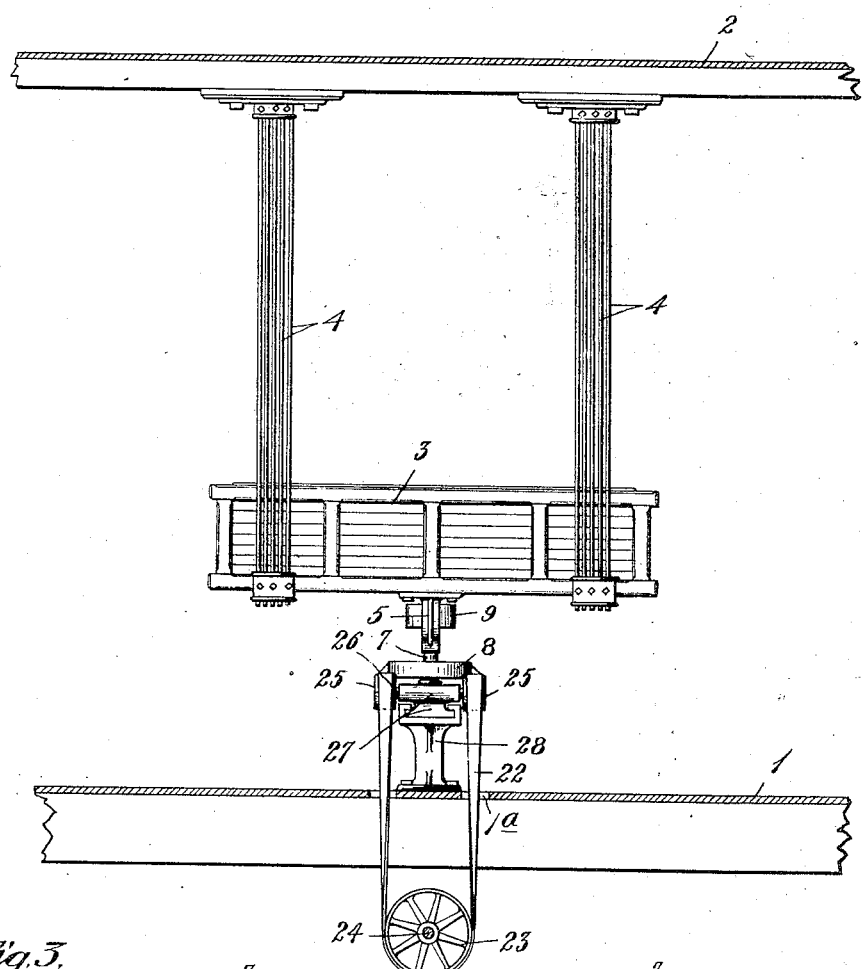
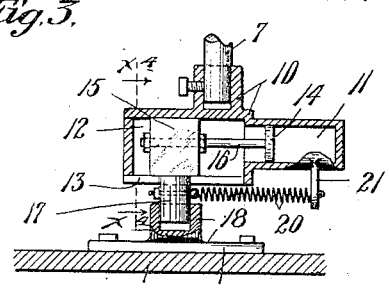
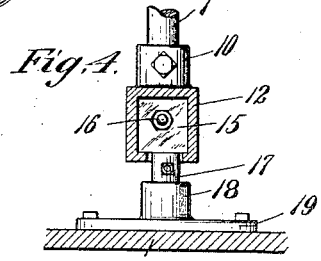

UNITED STATES PATENT OFFICE.

EMIL R. DRAVER, OF RICHMOND, INDIANA.

MEANS FOR IMPARTING GYRATORY MOTION TO SIEVE-BOXES AND OTHER BODIES.

No. 868,333.   Specification of Letters Patent.   Patented Oct. 15, 1907.

Application filed June 9, 1906. Serial No. 321,004.

*To all whom it may concern:*

Be it known that I, EMIL R. DRAVER, a citizen of the United States, residing at Richmond, in the county of Wayne and State of Indiana, have invented certain new and useful Improvements in Means for Imparting Gyratory Motion to Sieve-Boxes and other Bodies; and I do hereby declare the following to be a full, clear, and exact description of the invention, such as will enable others skilled in the art to which it appertains to make and use the same.

My present invention relates to means for imparting gyratory motion to sieve boxes and other bodies, and is in the nature of an improvement to the device set forth and claimed in application for Letters Patent of the United States, Serial No. 292,458, filed by Henry C. Draver and myself as joint inventors, of date December 19, 1905.

The invention consists of the novel devices and combinations of devices hereinafter described and defined in the claims.

In the accompanying drawings which illustrate the invention, like characters indicate like parts throughout the several views.

Figure 1:
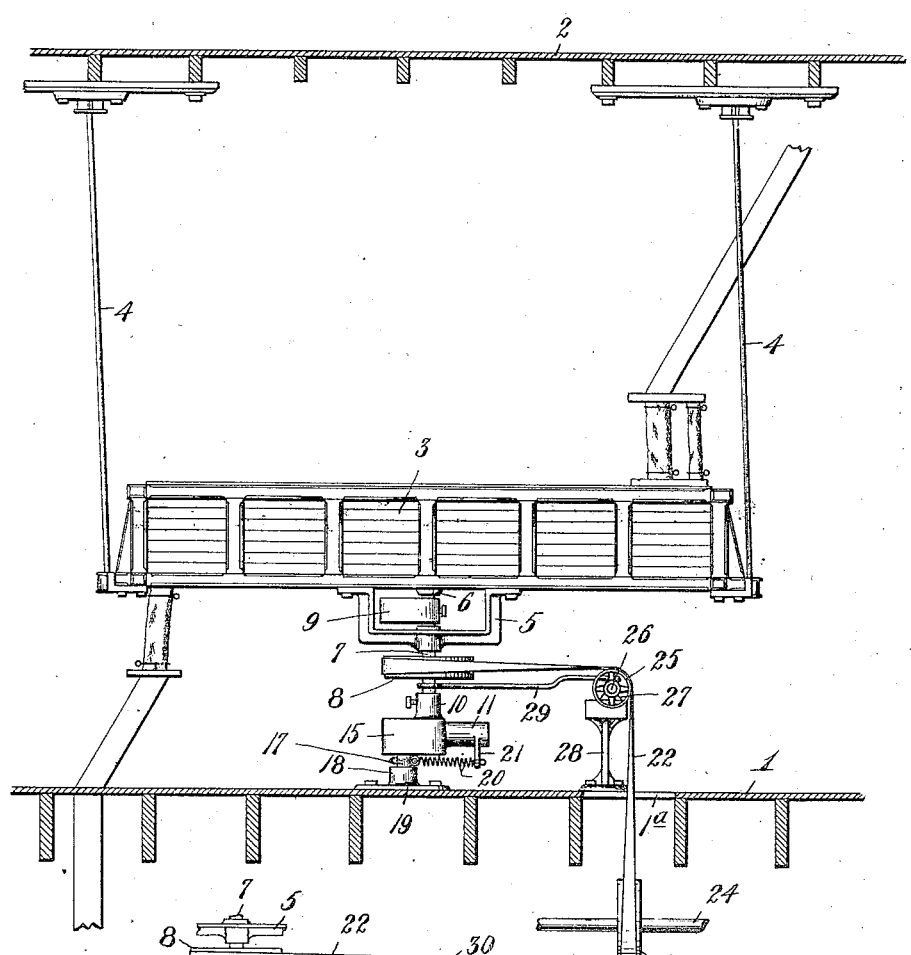
Figure 5:
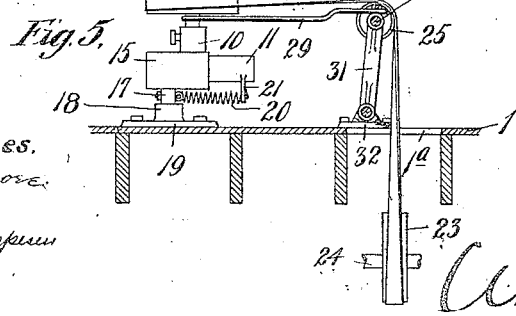

Referring to the drawings, Figure 1 is a view in side elevation showing a sieve box and illustrating my invention applied thereto, for the purpose of gyrating the said sieve box. Fig. 2 is an end elevation of the parts shown in Fig. 1. Fig. 3 is a detail view in vertical section illustrating the construction of the variable throw crank which forms a connection between the sieve box and a fixed support such as the floor. Fig. 4 is a transverse vertical section taken on the line $x^4$ $x^4$ of Fig. 3, and Fig. 5 is a view in side elevation illustrating a slightly modified form of the connection for imparting rotary motion to the variable throw crank.

The numeral 1 represents the floor of a mill or other building, and 2 indicates an overhead support, from which the sieve box 3 is shown as supported with freedom for gyratory motions, by suitable hangers shown as made up of groups of spring rods 4.

Rigidly secured to the bottom and central portion of the box 1 is a yoke-like bracket 5, in which and in a suitable bearing 6 on the bottom of said box, is journaled a short vertical shaft 7. This shaft 7, just below said bracket 5, is provided with a pulley 8; and just above said bracket, but below the bottom of the box, it is provided with an eccentrically located weight 9 that projects at one side of the shaft and constitutes what is designated as an unbalanced weight to the said shaft, and acts under rotation of said shaft to impart a gyratory motion to the sieve box 3.

To the lower end of the shaft 7 is rigidly secured a horizontally extended crank head 10 that is formed with a cylindrical section 11 and with a cross head guide 12, which latter is shown as rectangular in cross section, and is provided in its bottom with a longitudinally extended slot 13. The cylinder 13 serves as a dashpot, the outer end thereof being closed, and the inner end thereof being open; and in this dashpot a piston head 14 works with very slight clearance. A cross head 15 is mounted to slide in the cross head guide 12, and is connected by a stem 16 to the piston head 14. The said cross head 15 is provided with a depending crank pin 17 that is journaled in a socket 18 of a floor plate 19, which floor plate is, as shown, bolted to the floor 1. A coiled spring 20 which, as shown, is attached to the crank pin 17 and to a lug 21 depending from the cylinder 11, tends to move the entire crank head 10 into a position in which the crank pin 17 will aline axially with the crank shaft 7.

Motion is imparted to the crank shaft 7 by a belt 22 that runs over the pulley 8 of said shaft, and over a driving pulley 23 of a power driven shaft 24, which latter is shown as located below the floor 1. Said shaft 24 may be mounted in any suitable fixed bearings, not shown, and may be driven in any suitable way. The belt 22 passes upward through openings 1ª in the floor 1, and passes over a pair of laterally spaced idle guide pulleys 25, which pulleys are, as shown in Figs. 1 and 2, loosely journaled on a spindle 26 carried by a sliding block 27 that is mounted to slide in and is guided by a pedestal 28; which pedestal, as shown, is fixed to the floor 1 and has a channel-shaped upper end that engages the flanged base of said sliding block 27. The sliding block 27 is loosely pivoted to one end of a thrust link or rod 29, in the other end of which the shaft 7, on the sieve box 3, is loosely journaled.

In the construction illustrated in Fig. 5 the idle guide pulleys 25 are journaled on a shaft or spindle 30, that is carried by the upper end on a vibratory supporting frame or lever 31, the lower end of which is pivoted or fulcrumed to a fixed bearing 32 shown as secured to the floor 1.

When rotary motion is imparted to the shaft 7, which is carried by the sieve box 3, the unbalanced weight 9 will cause said shaft, and hence the sieve box, to take a gyratory motion, and the circuit of gyration will increase under the increasing speed of said shaft and weight, and conversely will be decreased when the rotary speed of said shaft is decreased. When the shaft 7 is at rest the crank pin 17 will be alined axially with the shaft 7, and when the said shaft is rotated and a gyratory motion is imparted to the sieve box and to said shaft, the said shaft and the crank head 10 will be moved to points of eccentricity, with respect to said crank pin, against the tension of the spring 20, such position being shown in Figs. 1 and 3. When the rotation of the shaft 7 is decreased or stopped, the spring 20 will restore the said parts to normal positions with the crank and shaft in axial alinement; but this movement will be retarded or rendered slow by the action of the piston 14 in the cylinder or dashpot 11, as the air compressed and confined in said dashpot will escape quite slowly therefrom, and thus acts as a cushion. The said cylinder and piston cushioning device also assists the spring 20, to a considerable extent, in retarding or rendering slow the increasing circuit of gyration under the increasing speed of the shaft 7; because of the fact that air must then enter the cylinder 11 to prevent formation of a partial vacuum therein, under the outward movement of the piston 14. In the above described construction it will be noted that the adjustable throw crank is positively rotated by the same means that rotates the unbalanced weight; that the crank pin of said variable throw crank rotates in a fixed bearing; and that the yielding action is between the crank and the body of the said variable throw crank.

Attention is now directed to the action of the means for imparting rotary motion to the shaft 7 and parts carried thereby. It will be noted that the belt 22 exerts a pull on the pulley 8 of the shaft 7 in a horizontal direction toward the right with respect to Fig. 1; and it will also be noted that the said belt exerts an equal pull or lateral pressure on the guide pulleys 25, in a horizontal direction toward the left. As these opposing forces or lateral strains in opposite directions are equal, and as the said shaft 7 and shaft 26 or 30, as the case may be, on which said pulleys 25 are mounted, are connected for common lateral traveling movements, it is evident that the pull of the belt is neutralized or caused to act against itself in such manner that the sieve box 3 is not pulled sidewise by the said belt; but is free to make its natural movements under the action of gravity and under the action of centrifugal force of the unbalanced weight 9. It will be noted that the guide pulleys 25 are arranged to guide the lower portion of the belt 22 in the plane of the driving pulley 23, and to guide the upper horizontal portion of said belt in the plane of the driven pulley 8 of the rotary crank shaft 7. It will also be noted that with this arrangement gyratory motions of the sieve box will not to any material extent vary the tension of the belt 22. Otherwise stated, the said pulleys 25 are positively and automatically moved, to take up the slack of the belt 22, and to maintain an approximately constant tension thereon. The said guide pulleys 25 are moved back and forth approximately in a vertical plane that intersects the axis of the driving shaft 24 and of the driven shaft 7, the latter assumed to be at rest or to be concentric or axially alined with the crank pin 17. This arrangement of the driving connection for rotating the unbalanced weight or the variable throw crank, or both, or for imparting rotary motion to other parts on a sieve box or other vibratory body I believe to be broadly new, and desire to claim the same broadly. The so-called crank pin or variable throw crank might be in the form of a socket arranged to swivel on a fixed trunnion or bearing.

The automatically adjustable, centrifugally actuated variable throw crank which connects the sieve box or gyratory body with the floor or other fixed support and limits gyrations thereof, is disclosed and broadly claimed in the application of Henry C. Draver and Emil R. Draver, S. N. 292,458, filed December 19, 1905, entitled "Means for imparting gyratory motion to sieve boxes and other bodies."

The application S. N. 292,458, filed December 19, 1905, by Henry C. Draver and Emil R. Draver, entitled "Means for imparting gyratory motion to sieve boxes and other bodies", discloses and claims broadly the combination of a gyratory body, a crank shaft mounted thereon and having an unbalanced weight, and a variable throw crank arranged to restrict the gyratory motions of said body, and the said Draver and Draver application also discloses and broadly claims a fluid cushioned steadying device arranged to restrict the gyratory motions of the sieve body, and, hence, I do not in this application make broad or generic claims thereto. Specifically considered, the said Draver and Draver application shows a variable throw crank, one member of which is journaled to a fixed support, such as a floor support, and the other member of which is journaled to the depending end of the crank shaft, which crank shaft is mounted in the sieve boxes and provided with an unbalanced weight.

My present invention is in the nature of an improvement on the construction disclosed and broadly claimed in the Draver and Draver application, and it consists in combining with the gyratory body, and a power driven crank shaft mounted thereon and provided with an unbalanced weight, a variable throw crank, one member of which is secured to the said crank shaft, and the other member of which is journaled to a fixed support, such as a floor support. In the best arrangement of this variable throw crank, the body portion thereof is secured to and rotates positively with the crank shaft, while its crank pin or adjustable part is journaled to a fixed support.

I claim as my invention:

1. The combination with a body mounted for gyratory motion, of a power driven shaft carried by said body and provided with an unbalanced weight, and a variable throw crank having its body secured to said shaft and having its crank pin or adjustable part journaled to a fixed bearing, substantially as described.

2. The combination with a body mounted for gyratory motion, of a vertical shaft journaled in bearings carried by said body and provided with an unbalanced weight, means for rotating said shaft, and a variable throw crank having its body portion secured to and carried by said shaft and having its crank pin or adjustable part journaled to a fixed bearing, and means for retarding the throw varying movements of said crank, substantially as described.

3. The combination with a body mounted for gyratory motion, of a power driven shaft carried by said body and provided with an unbalanced weight, a variable throw crank having its body secured to said shaft and having its crank pin or adjustable part journaled to a fixed bearing, and a cylinder and piston retarding device connecting the body and adjustable part of said crank, substantially as described.

4. The combination with a body mounted for gyratory motion, of a rotatable shaft carried thereby and provided with an unbalanced weight, means for rotating said shaft from a distant point, a variable throw crank having its body secured to said shaft and having its crank pin journaled in a fixed bearing, a spring tending to move said crank pin and said crank shaft into axial alinement, and a cylinder and piston retarding device connecting said crank pin to the body of said crank, substantially as described.

5. The combination with a body mounted for vibratory motion, of a rotary shaft carried by said body and provided with a driven pulley, a driving shaft supported independently of said vibratory body and provided with a driving pulley, a link supported at one end from said vibratory body, intermediate guide pulleys mounted for vibratory movements with the outer end of said link, a support for said intermediate pulleys and the outer end of said link independent of the said vibratory body, and a driving belt running over said driving pulley, over said driven pulley, and over said intermediate guide pulleys, substantially as described.

6. The combination with a body mounted for vibratory motion, of a rotary shaft carried by said body and provided with a driven pulley, a driving shaft supported independently of said vibratory body and provided with a driving pulley, a link having one end swiveled on the shaft which is carried by the vibratory body, intermediate guide pulleys mounted for vibratory movements with the outer end of said link, a support for said intermediate pulley and the outer end of said link independent of said vibratory body, and a driving belt running over said driving pulley, over said driven pulley, and over said intermediate guide pulleys, substantially as described.

7. The combination with a body mounted for gyratory motion in a horizontal plane, of a vertical shaft carried by said body and provided with an unbalanced weight, a driven pulley on said shaft, an approximately horizontal driving shaft provided with a driving pulley, a driving belt running over said driving and driven pulleys, a link supported at one end from said vibratory body, a pair of guide pulleys mounted for vibratory movements with the outer end of said link and arranged to guide said belt approximately in the planes of said driving and driven pulleys, and a support for said guide pulleys and the outer end of said link independent of said vibratory body, substantially as described.

8. The combination with a body mounted for gyratory motion, of a power driven shaft carried by said body and provided with an unbalanced weight, and a variable throw crank having one member secured to and rotatable with said crank shaft and having its other member journaled to a fixed bearing or support, substantially as described.

In testimony whereof I affix my signature in presence of two witnesses.

EMIL R. DRAVER.

Witnesses:
EVERETT R. LEMON,
HENRY C. STARR.